(12) United States Patent
Stamatescu

(10) Patent No.: US 7,432,715 B2
(45) Date of Patent: Oct. 7, 2008

(54) METHOD AND APPARATUS FOR METAL DETECTION EMPLOYING DIGITAL SIGNAL PROCESSING

(75) Inventor: Laurentiu Stamatescu, Torrensville (AU)

(73) Assignee: Minelab Electronics Pty Limited (AU)

( * ) Notice: Subject to any disclaimer, the term of this patent is extended or adjusted under 35 U.S.C. 154(b) by 9 days.

(21) Appl. No.: 11/574,065

(22) PCT Filed: Aug. 26, 2005

(86) PCT No.: PCT/AU2005/001283

§ 371 (c)(1),
(2), (4) Date: Feb. 22, 2007

(87) PCT Pub. No.: WO2006/021045

PCT Pub. Date: Mar. 2, 2006

(65) Prior Publication Data

US 2007/0296415 A1    Dec. 27, 2007

(30) Foreign Application Priority Data

Aug. 26, 2004    (AU)    ............................... 2004904842

(51) Int. Cl.
*G01V 3/10*    (2006.01)
*G01V 3/08*    (2006.01)
*G01V 3/11*    (2006.01)

(52) U.S. Cl. ..................... 324/345; 324/239; 324/331

(58) Field of Classification Search ......... 324/228–229, 324/234, 238–243, 256–258, 326, 329–331, 324/345; 702/35–38, 94, 104, 115–116, 702/124, 150, 158, 166, 172
See application file for complete search history.

(56) References Cited

U.S. PATENT DOCUMENTS 5,691,640 A    11/1997    King
2002/0163346 A1    11/2002    Arndt et al.

FOREIGN PATENT DOCUMENTS

WO    02/25318    3/2002

OTHER PUBLICATIONS

IJ Won et al., GEM-3 Monostatic Broadband Electromagnetic Induction Sensor, http://www.geophex.com/Publications/GEM-3%20by%20Won%et%20al%201997, 12 pages.

*Primary Examiner*—Bot LeDynh
(74) *Attorney, Agent, or Firm*—Brooks Kushman P.C.

(57) ABSTRACT

A metal detector employing digital means for the generation of highly quality reference signals used for transmission and demodulation and capable of continuously monitoring the parameters of the transmitting and receiving coils. Using the monitored signals and calibration of the measurements paths in both amplitude-frequency and phase-frequency, the effects of the targets and magnetic and/or conductive grounds on the transmitting and receiving coils are greatly reduced, leaving the received signals substantially free of instrumental effects. Methods of ground tracking and filtering are described to separate target information from the ground plus-target receive signals. Single-and multi-frequency operation, with or without modulation for both sinusoidal and square wave transmission, is described, as are means to detect abnormal situations and to find and operate at resonance.

43 Claims, 5 Drawing Sheets

METHOD AND APPARATUS FOR METAL DETECTION EMPLOYING DIGITAL SIGNAL PROCESSING

This application is a national stage filing under 35 U.S.C. 371 of International Application No. PCT/AU05/01283, filed Aug. 26, 2005, which claims priority from Australia Application No. 2004904842, filed Aug. 26, 2004, the content of which is incorporated herein by reference in its entirety.

FIELD OF THE INVENTION

The current invention relates to a continuous wave metal detector and a method of metal detection where signals employed are generated and/or processed digitally.

BACKGROUND OF THE INVENTION

Detection of metallic objects is usually done with metal detectors that use a transmitting coil to produce an interrogating magnetic field in the environment of a target. This magnetic field induces magnetic responses from the target and surrounding medium, which, in turn, induce a voltage in the receiving coil. This voltage is processed by the metal detector with the intent to remove signals produced by the environment and to differentiate between signals produced by different types of targets.

According to the temporal variation of the magnetic field produced by the electric current in the transmitting coil, the metal detectors are generally classified as pulse-induction (or time domain) and continuous-wave (or frequency domain). The current invention relates to continuous wave (CW) metal detectors, The main components of a conventional single frequency CW metal detector using analogue circuitry include;

(1) A search head comprising the transmitting and receiving coils in a nulled (induction balanced) arrangement.

(2) A transmitter that generates a sinusoidal signal with constant amplitude applied to the transmitting coil and, at the same time, the timing reference for the synchronous demodulators.

(3) A receiver that amplifies the weak signals from the receiving coil and applies them to the synchronous demodulators.

State of the art single frequency CW metal detectors track the phase angle of the ground signal while synchronously demodulating the received signal into two channels. One channel is continuously maintained in phase with the ground signal and has low gain. The other channel is out of phase by 90° (in quadrature) with the ground signal and thus, approximately in phase with the current in the transmitting coil. This channel has significantly higher gain than the other channel (about 100 times). This allows the detection of relatively weak target signals in the presence of large ground signals. The synchronously demodulated signals are low-pass filtered to remove components at the transmitted frequency and harmonics. The filtered signals are further processed to reject responses due to changes in the environment and to discriminate targets.

It is generally accepted that simultaneous operation on several frequencies would enable this type of CW analogue metal detector to achieve higher performance both in target discrimination and rejection of false signals due to environment. However, the difficulties in the construction of CW analogue multiple frequency metal detectors have prevented their proliferation. This is because for each extra frequency added to a conventional analogue metal detector, a number of blocks (including oscillators, phase locked loops, synchronous demodulators, and low-pass filters) would have to be added. This increases both the cost and the complexity of the detectors.

SUMMARY OF THE INVENTION

It is an object of the present invention to provide a multiple frequency metal detector that overcomes or at least substantially ameliorates the problems associated with the prior art, or at least provides the public with a useful alternative.

In one form, the invention may be said to reside in a metal detector of the continuous wave type including;

a transmission circuit and a transmitter coil adapted to produce an interrogating magnetic field for detection of a target;

a receiving coil and a receiving circuit adapted to receive and process a receive signal produced by a target and its environment in the interrogating field;

further including at least one digital signal generator adapted to generate at least one pair of reference sinusoidal signals of the same frequency;

wherein there is produced one or more output signals which are a linear combination of selected of said reference signals, said output signals being applied to a transmitter which produces at least one transmission signal said transmission signal being applied to the transmission circuit and transmitter coil combination to produce an interrogating magnetic field for detection of a target.

In preference, the selected reference signal or signals include no more than one of each pair of reference signals.

In a further aspect the invention is a continuous wave type metal detector which includes a transmitter, a digital signal generator which generates two reference sinusoidal signals in quadrature, an output signal produced by the same or different digital signal generator, a transmission signal having at least one signal derived from said output signal, and a transmission circuit and transmitter coil to produce an interrogating magnetic field for detecting a target, and a receiving coil and receiving circuit to process the response created by the target in the magnetic field.

The usefulness of the detector is greatly increased when the sinusoidal reference signals are produced with constant amplitude, substantially undistorted and substantially free of spurious signals.

To this end, in preference, the sinusoidal reference signals are generated using a method combining a direct digital synthesis method with a mathematically correct method employing trigonometric identities.

Preferably, the reference signal value corresponding to an angle $\phi$, which differs from an angle $\theta$ for which the reference signal value is pre-calculated and stored by an amount $\delta$ such that $\phi=\theta+\delta$, is generated using the trigonometric identities:

$$\cos(\phi)=\cos(\theta+\delta)=\cos(\theta)+[\alpha \cos \theta - \beta \sin \theta],$$

$$\sin(\phi)=\sin(\theta+\delta)=\sin(\theta)+[\alpha \sin \theta + \beta \cos \theta],$$

and wherein $$\alpha=-2\sin^2(\delta/2),\ \beta=\sin(\delta),$$

and where for computational convenience values of $\alpha$ and $\beta$ can be stored in an auxiliary table.

Preferably, there are means adapted to monitor the current through and/or the voltage across the transmitter coil and/or the transmission circuit, the values provided by said current or voltage monitoring being processed in combination with the receive signal to identify, at least in part, those components of the part of the received signal which are due to the changes in the transmit coil parameters produced by targets or varying soil or environmental conditions.

In preference, the identified components are removed or attenuated from the received signal.

In a further aspect of the invention the current and/or voltage through and/or across the transmitter coil and/or the transmission circuit are monitored to detect abnormal conditions and/or protect the transmitter and transmission circuit from unexpected events including short circuits or open circuit conditions.

In a further embodiment, there are means to monitor the values of receiving coil parameters which vary in use, the parameter values provided by said monitoring being processed in combination with the receive signal to identify, at least in part, the varying component of the received signals which is due to changes in the receive coil parameters produced by targets and varying soil or environmental conditions.

In preference, the means to monitor includes the generation of a pair of additional reference signals having a frequency different to any one or all of the frequencies of the transmitted signal or harmonics thereof, one of the additional reference signals being applied to the receiving coil with a suitable magnitude, the resultant signal in the receiving coil being detected by the receiving circuitry as part of the receive signal, the resultant signal being separated from the receive signal by post-processing to determine receiving coil parameters.

In a further aspect of the invention the transmitted signals are modulated and the received signals are subsequently converted to base band and demodulated to form the I and Q components and their derivatives with respect to frequency.

Preferably the demodulated signals are low pass filtered.

Optionally the received signals and the transmitter feedback signals are demodulated using pairs of analogue synchronous demodulators for each frequency, using timing reference signals from the digital signal generator.

In a further aspect of the invention, the ground related signals are eliminated using a method that employs one or more independent models for the ground (for example magnetic and conductive ground). This method splits the response into a fast varying part, due to the rapid changes of the distance between the search head and the ground during the search, and into a slowly varying part, due to gradual changes in the parameters describing the ground models from place to place.

In preference, ground related components in the receive signal are substantially separated from target related signals in the receive signal using a method that employs models for the ground which include an independent magnetic component and an independent conductive component, the method further including the effects of varying coupling between the transmitter coil or the receiving coil and the ground. The ground signal is estimated continuously with estimates for the values of the magnetic and conductive components are updated over a longer time span than estimates for the value of the coupling.

The detection and discrimination of the targets can be improved by using matched filtering, where a template determined from the less ground contaminated components of the target signal is applied to the more ground contaminated components of the target signal to improve the signal to noise ratio.

In an alternate embodiment of the invention the output signal is a digitally constructed signal and is applied to a digital to analogue converter (DAC) to generate a transmission signal that is substantially sinusoidal and applied to the transmitter, which is a linear amplifier.

Where the transmission signal is substantially sinusoidal, the frequencies of the reference signals are not integer multiples of each other.

Preferably the transmission circuit includes at least one circuit consisting of a transformer, each winding having substantially the same inductance as the transmitter coil, connected such that two signals of different frequency can be applied to the transmitter coil without influencing each other.

In alternate embodiment of the invention the digital signal generator generates a transmission signal that is substantially square wave.

Where the transmission signal is substantially square wave, the frequencies of the reference signals are multiples of each other.

Preferably the output signal is applied directly to the transmitter, which is a switching amplifier.

In a further form the invention may be said to reside in a method for detecting metallic targets in a ground including the steps of providing a transmission circuit and a transmitter coil adapted to produce an interrogating magnetic field for detection of a target;

providing a receiving coil and a receiving circuit adapted to receive and process a receive signal produced by a target and its environment in the interrogating field;

generating by digital means at least one pair of reference sinusoidal signals of the same frequency;

producing one or more output signals which are a linear combination of selected of said reference signals;

transmitting said output signal to produce the interrogating magnetic field for detection of a target.

In preference, the selected reference signal or signals include no more than one of each pair of reference signals.

In preference the sinusoidal reference signals are generated using a method combining a direct digital synthesis method with a mathematically correct method employing trigonometric identities.

In a preferred method the reference signal value corresponding to an angle $\phi$, which differs from an angle $\theta$ for which the reference signal value is tabulated by an amount $\delta$ such that $\phi=\theta+\delta$, is generated using the trigonometric identities:

$$\cos(\phi)=\cos(\theta+\delta)=\cos(\theta)+[\alpha \cos \theta - \beta \sin \theta],$$

$$\sin(\phi)=\sin(\theta+\delta)=\sin(\theta)+[\alpha \sin \theta + \beta \cos \theta],$$

and wherein $$\alpha=-2\sin^2(\delta/2), \beta=\sin(\delta),$$

and where for computational convenience values of $\alpha$ and $\beta$ can be stored in an auxiliary table.

Preferably the method includes monitoring the values of parameters of the transmit coil which vary with time or with characteristics of the ground or with movement over the ground, the values provided by said monitoring being processed in combination with a received signal to identify, at least in part, that component of the received signal which is due to the changes in the transmit coil parameters produced by targets and varying soil or environmental conditions.

Preferably the method includes monitoring the values of receiving coil parameters which vary in use, the parameter values provided by said monitoring being processed in combination with the receive signal to identify, at least in part, the varying component of the received signals which is due to changes in the receive coil parameters produced by targets and varying soil or environmental conditions.

In preference the relative amplitudes of the sinusoidal signals that make up the transmission signal are controlled to maximise the response of specific targets or to avoid the saturation of the receiver and/or analogue to digital converter following the receiver.

In preference ground related components in the receive signal are substantially separated from target related signals in the receive signal using a method that employs models for the ground which include an independent magnetic component and an independent conductive component, the method further including the effects of varying coupling between the transmitter coil or the receiving coil and the ground.

Preferably, the method includes steps wherein the ground signal is estimated continuously with estimates for the values of the magnetic and conductive components are updated over a longer time span than estimates for the value of the coupling.

In preference the target components more contaminated with ground related signals are estimated using a matched filter employing as a template the target components less contaminated with ground related signals.

In preference the amplitude-frequency and phase-frequency characteristics of each individual element and/or groups of elements are calibrated over the frequency ranges of interest.

BRIEF DESCRIPTION OF THE DRAWINGS

For a better understanding of this invention it will now be described with respect to the preferred embodiment which shall be described herein with the assistance of drawings wherein.

DETAILED DESCRIPTION OF THE INVENTION

A multiple frequency digital metal detector of the invention is a metal detector transmitting and receiving one or more signals of different frequencies generated and processed using digital techniques. In one embodiment, the metal detector generates two or more frequencies sufficiently different of each other so that effective ground rejection and target discrimination/identification become possible (multiple frequency metal detector). This is based on the fact that the response of different metallic targets and that of ground change in a different manner with the frequency of the interrogating magnetic field. However, in another embodiment, the metal detector could generate only one signal with a certain frequency (single frequency metal detector). This would correspond to either a metal detector with minimal cost or to a metal detector optimised for maximum sensitivity at that frequency. In the following, unless stated otherwise, the multiple frequency metal detector is described and the single frequency metal detector is considered as a particular case, when the number of transmitted frequencies is one.

Figure 1:
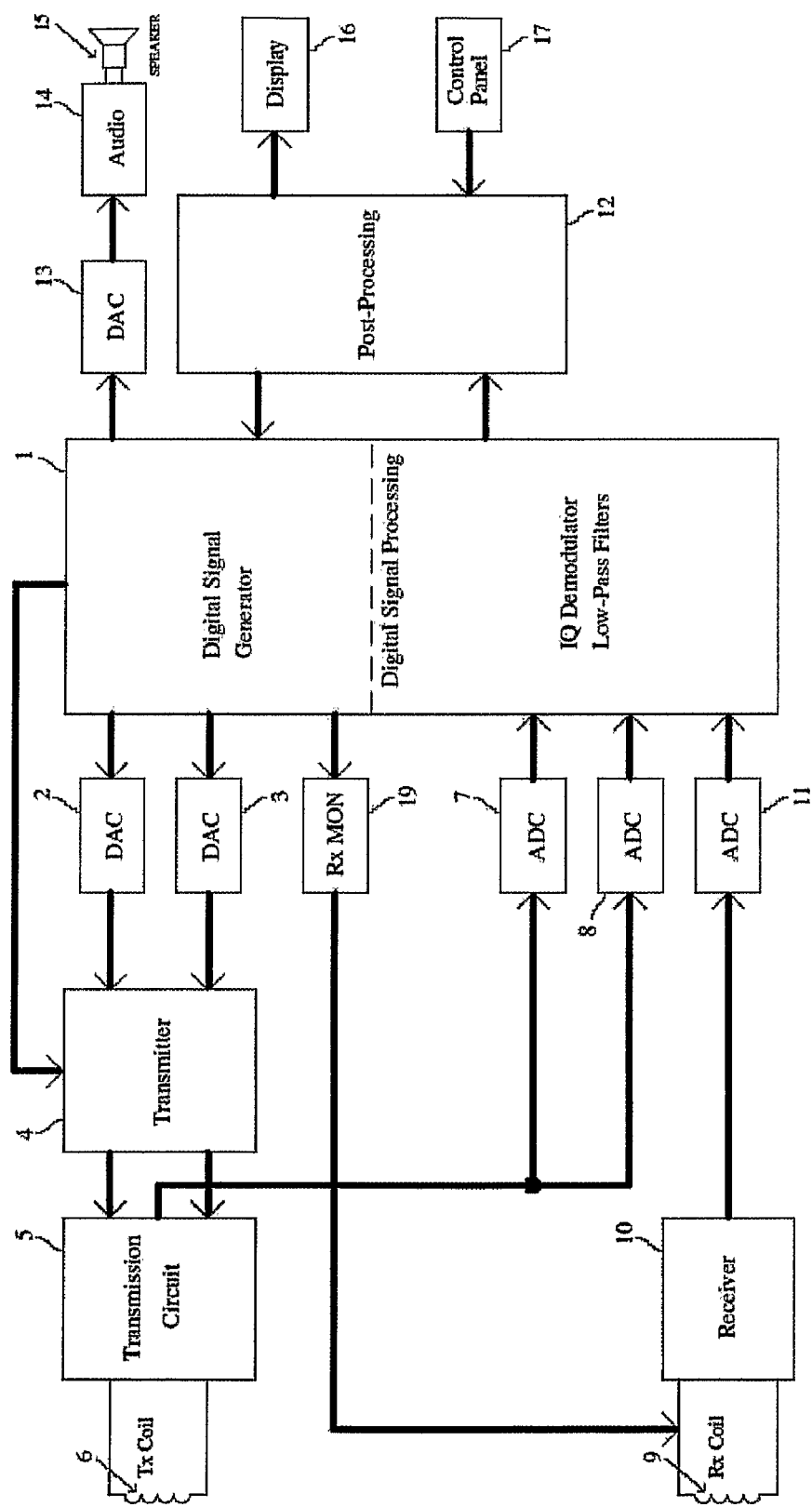
FIG. 1 is a block diagram of a metal detector according to a preferred embodiment.

FIG. 1 is a functional block diagram of a preferred embodiment of a fully digital metal detector. The digital signal processing block 1 contains a digital signal generator, which produces pairs of sinusoidal reference signals, which may be in quadrature, but may vary in phase by some other fixed amount, with frequencies ranging from under 1 kHz to over 100 kHz. For sine wave transmission, the frequencies of the reference signals pairs are not integer multiples of each other nor have common harmonics. A digital output signal is formed as a linear combination of reference signals. If required, these signals are modulated in any or all of amplitude, phase or frequency. For square wave transmission, the frequency of one pair of sinusoidal reference signals becomes the fundamental frequency and the others are harmonics of it (i.e. their frequencies are integer multiples of the fundamental frequency). Additionally, a transmitter-driving digital signal 18 is generated such that it is phase locked to the fundamental and it has increased spectral content at the desired harmonics. If required, these signals are modulated in frequency.

In the case of sinusoidal transmission, the digital signals are transformed into analogue signals by the DACs 2 and 3 and sent to the transmitter 4, which consists of two linear amplifiers. The amplified signals are applied to the tuned circuit included in the transmission circuit 5, which, together with the transmitting coil 6, resonates on several frequencies. The transmission circuit 5 includes means that allow the ADCs 7 and 8 to monitor the current through the tuned circuit and the voltage across the transmitting coil for amplitude and phase control purposes. This allows the detector to find and subsequently operate at or near the resonant frequencies of the tuned circuit, thus minimising the current consumption of the transmitter or maximising the current through the transmit coil. If single frequency operation is desired, only one DAC, amplifier and a simple parallel or series resonant circuit are sufficient.

In the case of the square wave transmission the DACs 2 and 3 and the tuned circuit of the transmission circuit 5 are not necessary, as the transmitter-driving signal 18 is applied directly to the transmitter 4, which is a switching amplifier. The current through and/or the voltage across the transmit coil are still monitored with a current sensing element (e.g. a current transformer or a low value resistor) and additional conditioning electronics, as in the case of sinusoidal transmission.

The digital signal generator (DSG) produces another pair of sinusoidal reference signals with a frequency different to any of the frequencies making up the transmitted signal and their harmonics. An output signal is created from these reference signals (either sinusoidal, with a DAC, or square wave) and this signal is applied through the Rx monitor block 19 with low amplitude to the receive circuit. For example, the signal can be applied through a large value resistor, making the signal appear as coming from a constant current source. The purpose of this additional signal is to permit a measurement of the receive coil parameters, in particular changes of the receive coil inductance different to the changes in the transmit coil inductance. These measurements are used in conjunction with algorithms in software to correct changes in the receive coil parameters due to varying soil mineralisation or large metallic targets and thus to eliminate false signals. The amplitude of the signal across the receive coil is chosen as a compromise between two conflicting requirements: large amplitude for accurate monitoring of the receive coil inductance and low amplitude for preserving the dynamic range for the receive signals.

The receiving coil 9 transforms the magnetic responses of the targets and the ground into varying electric signals. These signals and the signal applied directly to the receive coil are further amplified and filtered by the receiver 10 and digitised by the ADC 11.

The digital data received from each ADC is demodulated by the IQ demodulator included in the digital signal processing block 1. This demodulator uses in-phase (I) and in-quadrature (Q) reference signal pairs from the digital signal generator existing in the same block. The demodulated I and Q signals for each frequency are filtered and down-sampled using the multi-rate low-pass filters included in the digital signal processing block 1.

The filtered demodulated signals are continuously sent to the post-processing block 12, which is responsible for further processing, indicating and/or communicating the detection results and providing an interface with the user. Here further processing means the elimination of ground signals and the detection/discrimination of targets. The post-processing block is also responsible for controlling the detection parameters; for example, it can set the operating frequencies and amplitudes of the detector, search for the resonant frequencies and avoid interfering signals. The post-processing block performs these functions by controlling the digital signal processing block 1. In this implementation, the post-processing block uses the digital signal generator to produce the audio signal, which is converted into an analogue signal by the DAC 13, amplified by the audio stage 14 and applied to the speaker 15. The visual indication is presented on the display 16 and the input from the user is entered via the control panel 17.

There are several advantages in implementing a multiple frequency metal detector with digitally intensive techniques. One advantage is that most of the hardware, except for the tuned circuit in the case of the sinusoidal transmission, changes little with the number of frequencies being used. It is mostly the storage requirements and the calculations to be carried out that scale proportionally with this number.

Another advantage comes from the use of the digital IQ demodulator and low-pass filters. This combination has a better signal to noise ratio and is less susceptible to interference than the synchronous demodulators and low-pass filters combination commonly used in conventional analogue CW metal detectors. This is due to the fact that the IQ demodulator uses sinusoidal reference signals, while the reference signals for the analogue synchronous demodulators are typically square waves. The numerous harmonics of the square wave reference signals allow noise and interfering signals to contaminate the demodulated signals. At the same time, the digital low-pass filters, if properly designed, have very steep attenuation outside the pass-band, limiting the amount of noise and interfering signals that can get through.

A further advantage of the digital implementation is the fact that it eliminates the need for temporally matched filters present in some conventional CW metal detectors. Since the signals for all ADCs and for all frequencies are processed using identical calculations, all demodulated signals are inherently temporally matched.

Yet another advantage of the digital implementation is that it is also possible to modulate each transmitted signal in a variety of ways. In the case of sinusoidal transmission it is possible to use amplitude or phase/frequency modulation. For example, each primary signal of frequency $f_p$ can be amplitude modulated with a secondary signal of substantially lower frequency ($f_s$). It is known that, depending on the modulation index, an amplitude-modulated signal can be represented as a sum of two or three signals: the sum and difference signals ($f_p-f_s$ and $f_p+f_s$) and the carrier (the original signal of frequency $f_p$). The frequency of the secondary signal $f_s$ should be chosen such that the ratio $f_p/f_s$ is comparable with the quality factor of the tuned circuit at the frequency $f_p$. By processing the modulated signal it is possible to obtain information about the targets and ground not only at the primary frequencies, but also around them. Taking the difference between the I and Q responses at $f_p+f_s$ and $f_p-f_s$ and dividing by the side-band separation ($2f_s$) gives an estimate of the derivative of the target or ground response with respect to frequency ($\partial I(f_p)/\partial f$, $\partial Q(f_p)/\partial f$). Knowledge of these derivatives, in addition to the average responses at the primary frequencies, can improve both target discrimination/identification and ground interference rejection.

An additional benefit of modulation is that if the magnitude of the current through the tuned circuit is known at each of the three frequencies it is possible to determine the instantaneous value of the resonant frequency of the transmit circuit (and thus the transmit coil inductance), according to the formula:

$$f = f_p + (f_p - f_s)\frac{m_{p-s} - m_{p+s}}{m_{p-s} + m_p + m_{p+s}}.$$

Another example of modulation that can be applied to the primary signal is the phase/frequency modulation. An advantageous type of such modulation, characterised by constant envelope, is minimum phase keying (MPK), also known as continuous phase frequency shift keying (CPFSK). The low frequency modulating signal can be a pseudo-random sequence, a sine wave, a triangular wave etc. If the demodulating reference signals follow the instantaneous frequency of the transmitting signal, then the averaged ground and/or target response around the primary frequency $f_p$ is obtained. If the demodulating signals are processed such that the signals are added when the instantaneous frequency is above $f_p$ and subtracted when the instantaneous frequency is below $f_p$, then the derivatives of the target or ground response with respect to frequency are obtained. The signal-to-noise ratio of this method is better than that of the amplitude modulation, but the processing is more complicated.

In the case of the square wave transmission the duration of the transmitted cycle can be modulated with a low frequency signal, in effect frequency modulating both the fundamental and the harmonics in a fixed ratio. The received signals are processed as above for the phase/frequency modulation.

All types of modulation have the effect of spreading the spectrum of each primary signal and can help when there are interfering signals that cannot be avoided by a judicious selection of the primary signals or when it is desirable to lower the spectral density at the primary frequencies.

Figure 2:
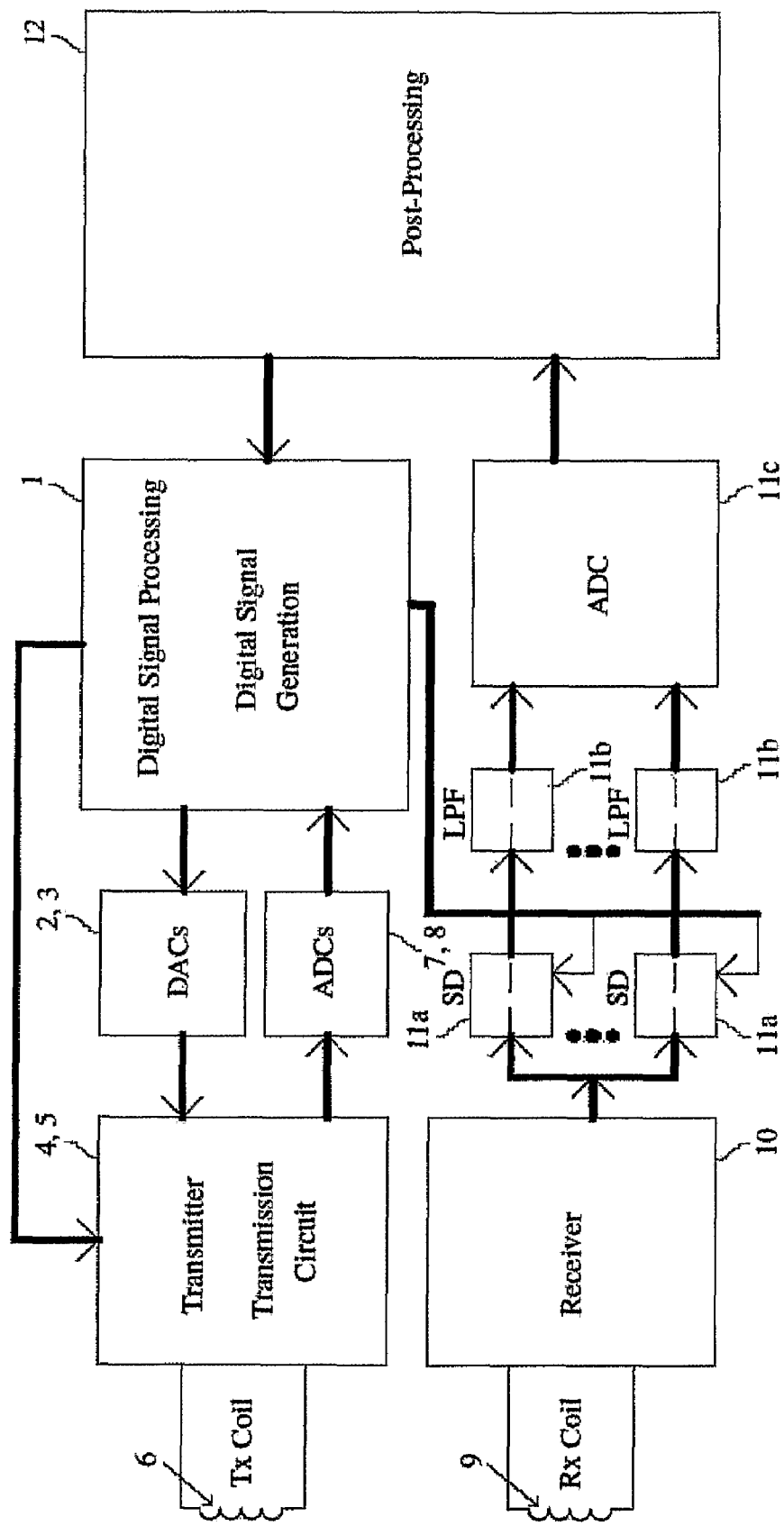
FIG. 2 is a block diagram of an embodiment of the invention in a hybrid digital metal detector.

The functional block diagram of an embodiment of the hybrid digital metal detector is presented in FIG. 2. The roles of the blocks 1 to 10 are the same as those in FIG. 1 and the blocks 13 to 17 have been omitted for simplicity. The amplified analogue signals coming from the receiver 10 are demodulated by a number of pairs of synchronous demodulators 11a equal to the number of frequencies used. The synchronous demodulators receive timing signals from the digital signal-processing block 1. The demodulated signals are further filtered and amplified by the low-pass filters 11b, converted to digital signals by the multi-channel or multi-plexed ADC 11c and sent to the post-processing block 12.

The main advantage of the hybrid digital metal detector is given by the fact that the channels making up the pairs for each frequency can be amplified with different gains before the analogue-to-digital conversion, enabling better resolution for target signals in the presence of large ground signals. In this case, the low gain channel is maintained in phase with the ground signal, while the high gain channel is orthogonal to it. It should be noted that the monitoring of the transmitter feedback signals (current and voltage) can also be done with synchronous demodulators, low-pass filtering and digitisation as for the receive signals.

In the following, the blocks that are common to both the fully digital and the hybrid digital metal detector are presented in greater detail (blocks 1 to 10 in FIGS. 1 and 2).

The digital signal generator contained in the digital signal-processing block 1 produces sinusoidal reference signals using direct digital synthesis (DDS), recursive methods, numerical oscillators, arbitrary wave generators or any other digital means. Irrespective of the method chosen, it must generate sinusoidal waves with constant amplitude, minimum distortion and free of spurious signals. The above-mentioned advantage of the IQ demodulator over analogue synchronous demodulator could be diminished if the sinusoidal reference signals produced by the digital signal generator are spectrally impure. Also, in the case of square wave transmission, a high level of reference signal distortion would mean that the higher frequency transmitted signals would interfere with the reception of the lower frequency signals.

The DDS method presents distinct advantages for this application: it offers good frequency resolution and amplitude control, it is easy to implement and relatively economical in terms of both storage and computational effort. For example, the frequency resolution obtained using a 16 bit phase accumulator and a sample rate of 96 k sample/sec is 1.465 Hz, which is more than adequate for the tuned circuit. However, the spectral quality of the generated signals is rather low, the most severe effect being the presence of oscillations in the demodulated signals for certain values of the generated frequencies. Techniques like feed-forward error correction and dithering can improve the spectral purity to a limited extent, but not enough to completely avoid this effect.

The recursive methods use trigonometric identities to generate sinusoidal signals with good spectral content, but have amplitude stability problems in the presence of round-off errors. However, combining the trigonometric identities of the recursive method with the DDS technique produces an efficient algorithm for the generation of sinusoidal signals of adequate quality. This method is shown in the following.

The DDS method utilises a phase accumulator and a table with values of the trigonometric functions (e.g. cosine). When a new value needs to be generated, the upper part of the phase accumulator is used as an index in the table. However, this is equivalent to the truncation of the phase, i.e. instead of obtaining the correct value $\cos(\phi)$ the value generated is $\cos(\theta)$. Here $\phi$ is the phase accumulator content ($\phi=\theta+\delta$), $\theta$ is the truncated value of the phase (upper part of the phase accumulator) and $\delta$ is the phase error (lower part of the phase accumulator). The correct value can be generated by employing the following trigonometric identities:

$$\cos(\phi)=\cos(\theta+\delta)=\cos(\theta)+[\alpha\cos\theta-\beta\sin\theta],$$

$$\sin(\phi)=\sin(\theta+\delta)=\sin(\theta)+[\alpha\sin\theta+\beta\cos\theta],$$

$$\alpha=-2\sin^2(\delta/2), \beta=\sin(\delta).$$

Although the above formulae appear complicated, their evaluation is very fast on a modern digital signal processor. The values for $\cos(\theta)$, $\alpha$ and $\beta$ are pre-calculated and saved in tables whose total size is very much smaller than the size of the table that would have been required by the normal DDS method for the same level of distortion and spurious signals.

In the case of sinusoidal transmission, the amplitude of the transmitted signals can be controlled independently for each frequency. This could be necessary for tuning and in order to optimise the transmitter for operation with maximum power and minimum distortion. The amplitude of the transmitted signals can be reduced below the optimal maximum level when the received signals are too strong (overloading) due to large targets or very mineralised ground. This way it is possible to extend the dynamic range of the detector by adjusting the strength of the transmitted signal such that the ADC 11 of the fully digital metal detector or the synchronous demodulators 11a of the hybrid digital metal detector operate optimally (close to the full range of their inputs). However, as the transmitted signal is being reduced, the sensitivity to small targets is progressively lost.

Independent amplitude control also allows transmitting more energy at the frequencies where desired targets would respond better, if their characteristics are known in advance. Smaller amounts of energy are still transmitted at the other frequencies, to allow the elimination of ground related signals and to permit discrimination.

If more than two frequencies are generated, as in the case of one preferred embodiment, the signals must be combined (added) before being transformed into analogue signals by the DACs 2 and 3.

However, it is not always necessary to use 2 DACs for driving the transmitter, the minimum number being one. It is obvious that the more signals are output through one DAC, the less is the effective resolution (in bits) for each signal. The number of DACs required also depends on the configuration of the combination transmitter/tuned circuit, as explained below.

Figure 3:
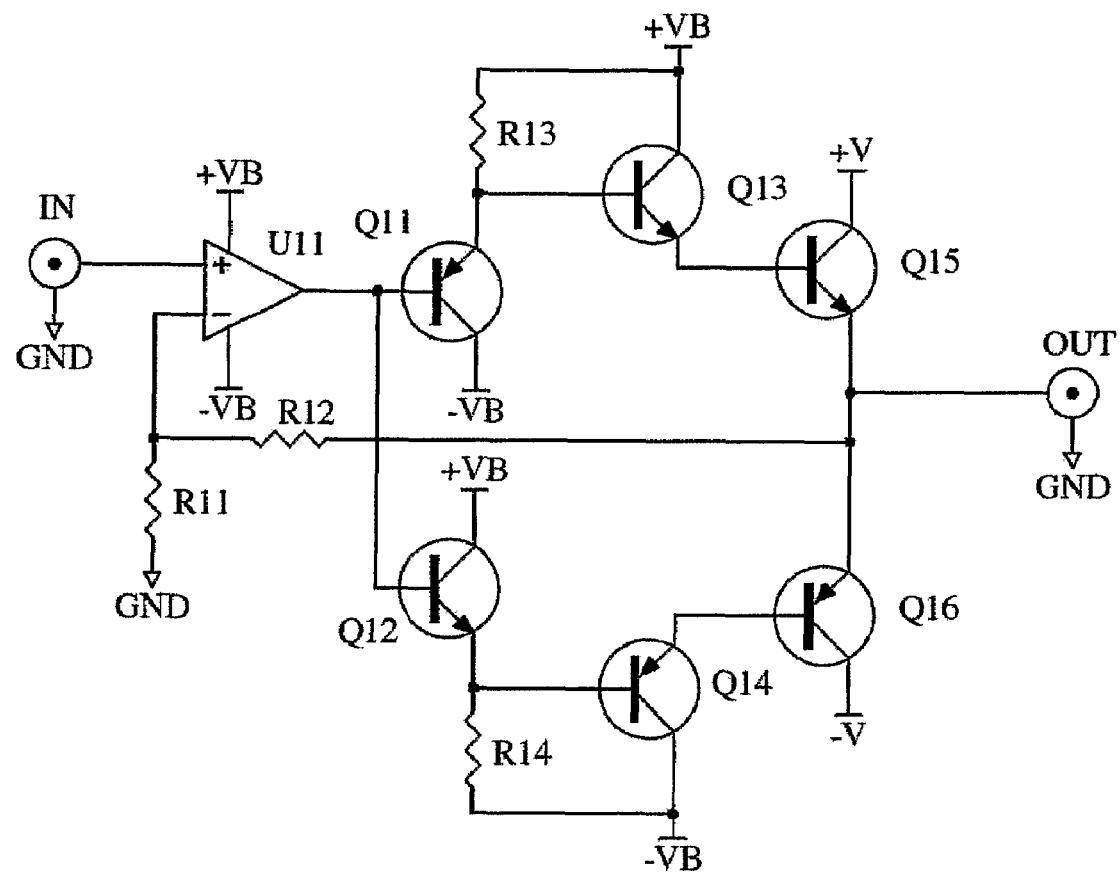
FIG. 3 is an embodiment of the transmitter circuit.

For each DAC used to convert the generated signals, the transmitter 4 includes an optional anti-alias low-pass filter and a low distortion power amplifier. The anti-alias low-pass filter is necessary for the correct reconstruction of the transmitted signals. The over-sampled DACs normally used for audio applications have rather relaxed requirements in this respect, so a first order low-pass filter is generally sufficient. A possible implementation of the transmitter circuit that is suitable for the preferred embodiment (without the anti-alias filters) is presented in the FIG. 3. Each power amplifier consists of a low-power operational amplifier and driver stage supplied from a low current dual bias supply (+VB and −VB), followed by a buffer stage supplied from the main dual supply (+V and −V). If the transistors used in the buffer stage have low saturation voltage and the bias supply is sufficiently higher than the main supply, good power efficiency and low distortion can be achieved concomitantly. It is understood that this circuit is presented as an example and other implementations of the transmitter circuit can be used as well.

In the case of sinusoidal transmission, the tuned circuit of the transmission circuit 5 and the transmitting coil 6 resonate at certain frequencies. If the frequencies of the generated signals are adjusted to be close to the resonant frequencies, the current consumption of the transmitter 4 is minimised, in the case of the parallel resonant circuit, or the current through the transmitting coil is maximised, in the case of the series resonant circuit. It should be noted that if there is an interfering signal close to one of the resonant frequencies then the operating frequency can be deliberately offset from that resonant frequency by an amount comparable with the bandwidth of the low-pass filters. In such a case the current through the coil will have both amplitude and phase changes compared to the resonant situation, but these will be corrected by the current monitoring circuit.

Figure 4B:
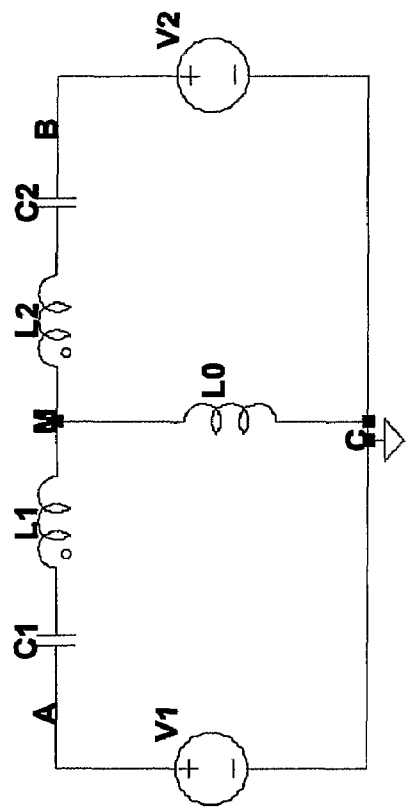
FIG. 4b is an embodiment of the tuned circuit for 2 frequencies.
Figure 4A:
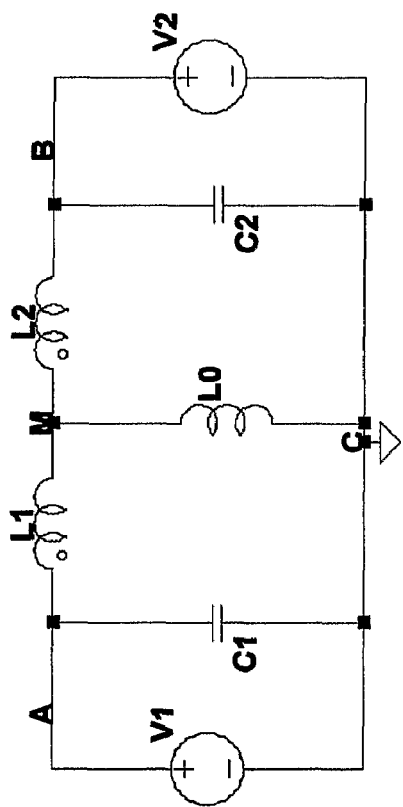
FIG. 4a is an embodiment of the tuned circuit for 2 frequencies.
Figure 5A:
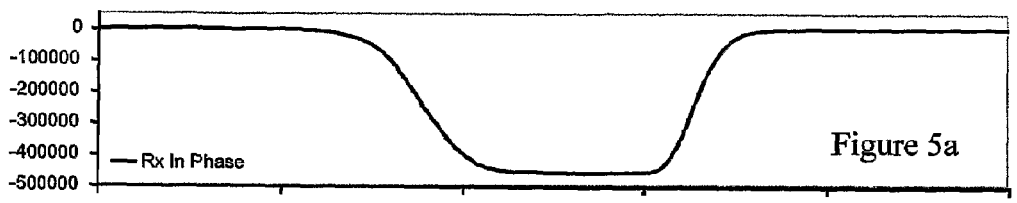
FIG. 5a-f show exemplary signal waveforms produced in the embodiment of FIG. 1.
Figure 5B:
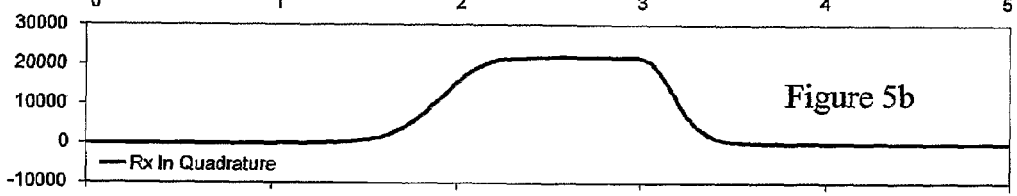
Figure 5C:
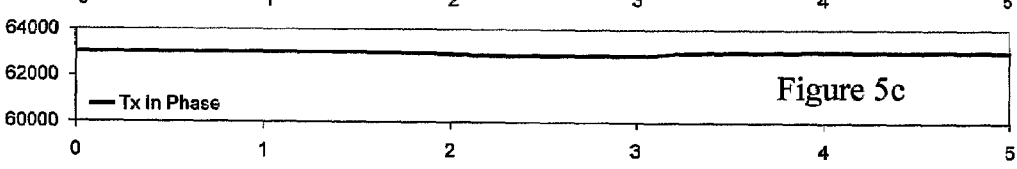
Figure 5D:
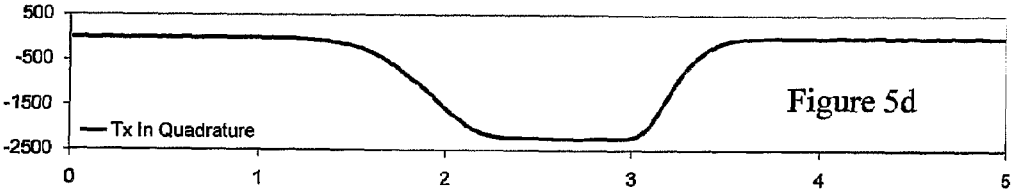
Figure 5E:
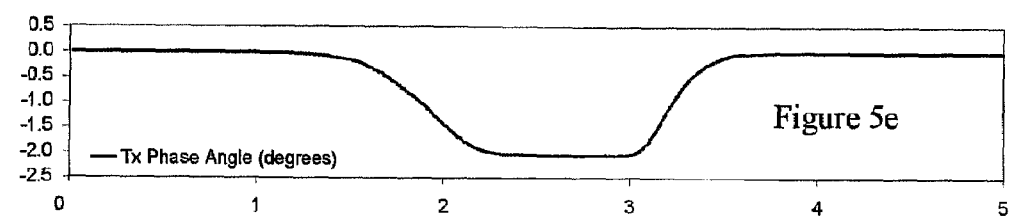
Figure 5F:
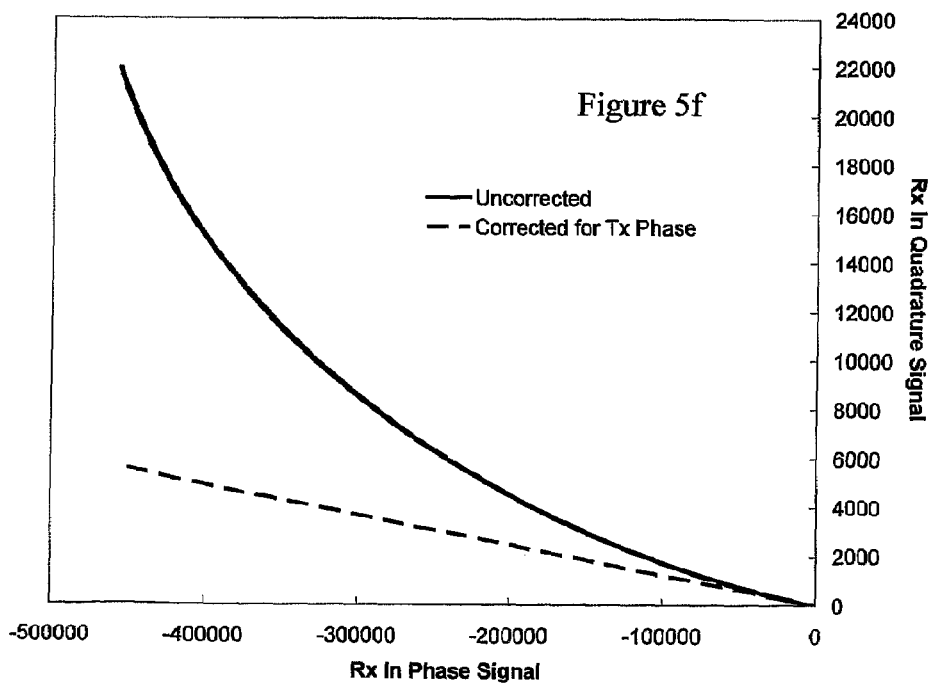

The circuits presented in FIG. 4 are resonant on 2 frequencies and rely on the fact that the inductance of each winding of the transformer (L1, L2) is equal to the inductance of the transmitting coil 6 (L0). They also rely on the coupling coefficient between the windings of the transformer being unity and the phasing of the windings being as indicated by the dots corresponding to the beginning of each winding. Under these conditions and neglecting any resistance in circuit, it can be shown that any alternating current voltage applied between A and C produces no voltage between B and C and vice versa. This can be understood by observing that the voltage applied between A and C is divided equally between the transformer winding (between A and M) and the transmitting coil (between M and C). The current flowing through the winding L1 induces in the winding L2 a voltage identical to the voltage across L1; therefore, the phase of the voltage between M and B (across L2) is the same as the phase of the voltage between M and C. Since the magnitudes of the two voltages are the same, the total voltage between B and C is zero. Therefore, any impedance connected between B and C has no effect on the current flow produced by a voltage source connected between A and C and vice versa. The transformer acts as an isolator and each side of the circuit resonates on a frequency that depends only on the capacitance of the tuning capacitor and total inductance of the corresponding transformer winding and transmitting coil.

Detailed numerical modelling of the circuits with typical departures from the simplifying assumptions has shown that the isolation between the two sides of each circuit remains very good. The effects investigated included resistance for the elements of circuit, non-unity coupling between transformer windings, non-equal values for inductance, parasitic capacitance. Careful measurements on constructed circuits showed excellent agreement with the calculations.

The transmission circuit 5 includes a sensing element for monitoring the current through the tuned circuit. The sensing element can be any passive circuit element (a low-value resistor or a current transformer, a low-value inductor, a large-value capacitor) whose complex impedance over the frequency range of interest is known accurately. The voltage across the sensing element is amplified, filtered and applied to the ADC 7. The digitised signal is proportional to the tuned circuit current and is IQ demodulated similarly to the received signal.

It can be shown that, in the case of the parallel resonant circuit, this signal is in quadrature with the current through the transmit coil at resonance. Its phase is very sensitive to any changes in the phase of the current through the transmit coil. The reason for this sensitivity is the steep phase versus frequency characteristic of a parallel tuned circuit with reasonable quality factor Q. As an example, a tuned circuit with a Q of about 15 showed a phase gain of 22 degrees/degree, being capable of indicating minute changes of the transmit coil inductance.

In the case of the series resonant circuit or for square wave transmission, the signal from the sensing element is proportional to and in phase with the current through the transmit coil. For this reason, the sensitivity to phase changes in the transmit coil current is unity.

The total signal across the transmitting coil and the sensing element is amplified, filtered and applied to the ADC 8. This digitised signal is also IQ demodulated similarly to the received signal. The difference between the corresponding low-pass filtered components from ADC 7 and ADC 8 (scaled by their analogue gains and corrected for any phase differences) is used to determine the voltage across the transmitting coil alone.

Knowledge of the current through and/or the voltage across the transmitting coil makes possible to correct the perturbations caused by the changes in the parameters of the transmitting coil (inductance and resistance). This happens when the search head is moved over large metallic targets and/or above mineralised ground with significant magnetic susceptivity and the distance between the search head and ground varies during the sweep. These measurements also allow the removal of the DAC noise and drift coupled into the receive coil through imperfect nulling or large ground or target signals.

The receiver 10 consists of a low-noise amplifier that increases the amplitude of the signals induced into the receiving coil 9 by the magnetic fields from the ground and/or targets. The gain of the receiver is selected such that the amplitude of the largest expected signals is equal to the full scale input of the following stage (the ADC 11 in the case of the fully digital metal detector or the synchronous demodulators 11a in the case of the hybrid digital metal detector). The receiver can include band-pass filtering to reject broadband noise and signals unrelated to the transmitted magnetic field.

Due to the filtering performed by the receiver and the resistive loading of the receive coil (required to damp its own resonant frequency), in general the receiver has a complex gain that varies with the frequency. This means that both the amplitude-frequency and the phase-frequency characteristics must be accurately calibrated and corrected for, at least over the frequency ranges of interest. The correction can be implemented in many ways: tables, functional dependence, experimental calibration. Other methods will be known to the person skilled in the art.

In the case of the fully digital metal detector the ADC 11 digitises the received signal and sends it to the digital signal-processing block 1. Here, the digitised received signal is demodulated using IQ demodulators for each transmitted frequency. This type of demodulator is based on the digital multiplication of the incoming signal with pairs of sinusoidal reference signals. The pair corresponding to each frequency consists of the signal sent to the transmitter for that frequency (for example cosine) and a signal in quadrature to it (for example sine), both produced by the digital signal generator. The results of the multiplication are two complex signals containing components with frequencies equal to the sum and the difference of the frequencies of the signals being multiplied. Each product has a nearly DC (direct-current) term, one being the I (in-phase) component and the other being the Q (in-quadrature) component. They correspond to the components with the frequency equal to the difference between the reference signals and that part of the received signal with nearly the same frequency as the reference signals. These components are the only ones conveying useful information about the targets and the ground. Applying low-pass filtering to the products, will separate the nearly DC terms and eliminate the high frequency components. As the spectrum of the I and Q components is only significant at low frequencies (generally below few tens of Hertz), the data rate of the low-pass filtered components can be reduced (decimated) significantly. This is obtained using multi-rate low-pass filters.

The post-processing block 12 performs a number of operations on the I and Q components corresponding to each transmitted frequency. The first operation consists in correcting the phase of the demodulated signals such that the I components are orthogonal to the current through the transmitting coil (and the Q components are in phase with it). This can be done by rotating the original received I and Q components by an angle consisting of two elements: one derived from the signals digitised by the ADCs 7 and 8 (which are related to the current through the transmitting coil) and the other from the receiver phase-frequency characteristic. The rotation is achieved by forming a linear combination of the I and Q components. For example, if the axes are to be rotated by an angle α in the trigonometric positive direction, the required calculations are given by:

$$I'=I\cos\alpha+Q\sin\alpha$$

$$Q'=-I\sin\alpha+Q\cos\alpha$$

The second operation consists in the amplitude correction, required to make the pairs of components of different frequencies commensurable. For this correction, knowledge of the current through the transmit coil, operating frequencies and receiver amplitude-frequency characteristic are necessary.

These corrections assume that the ADCs 7, 8 and 11 have flat amplitude response and the same group delay. They also assume that any other analogue processing does not introduce any amplitude or phase distortions. If this is not the case, corrections must be made or the amplitude and phase must be calibrated experimentally. This can be done by substituting the transmitting coil, the tuned circuit (if appropriate) and the receiver with suitable resistive networks connected between the transmitter output and the inputs of the ADCs. The frequency is then scanned over the frequency ranges of interest and the measurement results (amplitude and phase) processed in a form suitable for implementing the corrections.

Referring to FIG. 5, we illustrate one way in which information from monitoring the transmit coil the can be processed in combination with the receive signal to eliminate the part of the received signals due to the changes in the transmit coil parameters produced by varying soil conditions. In this example, the metal detector is of the single-frequency type, and so only phase correction from the transmitter monitoring is relevant. FIGS. 5a-5d show the result of demodulated signals from the receiver (5a and 5b) and the transmit monitoring device (5c and 5d), in this case a low-value resistor in series with the transmit coil windings which are configured in series resonance. During the 5-second interval shown, the metal detector coil is moved from the air down onto the surface of a sample of highly-mineralised soil from the Australia goldfields, where it sits for approximately 1 second before being raised into the air again. The transmit phase (5e) is formed directly from the in-phase (5c) and in-quadrature (5d) of the monitored transmit current. Whereas the curves in FIGS. 5a and 5b appear to have similar, if inverted, shapes, plotting the in-quadrature against the in-phase components of the receive signal produces the solid curve in FIG. 5f. which illustrates the non-linearity introduced into the receive measurements by the effect of the ferrite-like nature of the ground on the inductance of the transmit coil. The changed inductance of the transmit coil when it is in the vicinity of the ground introduces the phase shift shown in FIG. 5e. If this transmit phase shift is continuously applied to the receive signals, the instrumental non-linearity is reduced, as can be seen in the dashed curve in FIG. 5f. The linear relationship between the in-phase and in-quadrature components of the receive signal represents the physics-based response of a slightly-lossy magnetic ground, which is well known to those familiar with the art. Because of the linear nature of this ground signal, a number of well-known techniques can be applied to remove ground effects from the detector response.

For example, it is possible to further change the phase of the newly formed signals such that at each frequency one component (I') is aligned with the ground signal and the other component (Q') is orthogonal to the ground signal. This is essentially equivalent to the ground balance procedure as used in the single frequency conventional metal detectors. However, this is not the only possible method of ground balance, so a number of other techniques for manipulating the I and Q signals can be applied for both ground rejection and target discrimination/identification.

As an area of ground is investigated with the metal detector, the received signals change on two different time scales: a fast time scale, corresponding to signals variations caused by the continuously changing distance between the search coil and the ground, and a slow time scale, corresponding to signal variations due to the gradual changes in the composition of the soil. The signals caused by the ground can be accounted for by one or more mechanisms, for example ground magnetic response and ground conductivity. Given the different nature of these effects, their strength is not, in general, correlated. Therefore, the elimination of ground induced signals is based on two types of tracking loops: a fast loop which models the variable coupling between the search coil and the ground, and a slow loop which tracks changes in the parameters associated with the independent ground models.

To illustrate this method, we will consider a situation where the detector operates on 3 frequencies and the ground is both magnetic and conductive. The 6 received signals (I and Q for each of the frequencies) can be stacked as a column vector, shown below in transposed form:

$$R_T=[I_1,I_2,I_3,Q_1,Q_2,Q_3].$$

The estimate of the received signal due to the ground is given by:

$$\hat{R}(t)=g(t)[m(t)M+c(t)C]=g(t)G(t). \quad (1)$$

In this equation, g(t) represents an estimate of the strength of the coupling between the coils and the ground, while m(t) and c(t) represent the magnetic and conductive contributions to the ground signal. These contributions are related to the concentrations of magnetic minerals and salt minerals/moisture in the soil. In the case of a handheld metal detector, g(t) has variations on the time scale of the order of a second (depending on the swing), while m(t) and c(t) have variations on a much longer time scale (tens or hundreds of seconds, depending on the ground conditions and the speed of advancement). The vectors M and C represent the constant vectors modelling the magnetic and conductive properties of the ground and simple examples are given below.

The model chosen for the magnetic ground is that of a super paramagnetic medium, with a frequency dependent complex magnetic susceptibility $\chi(\omega)$:

$$\chi(\omega)=\chi_0\left[1-\frac{\ln[(1+i\omega\tau_2)/(1+i\omega\tau_1)]}{\ln(\tau_2/\tau_1)}\right],$$

where $\chi_0$ is the DC value of the magnetic susceptibility and the parameters $\tau_1$, $\tau_2$ ($\tau_1<<\tau_2$) represent the lower and the upper limits for the log-uniform distribution of relaxation times. If $\omega>>1/\tau_1$, the following approximate relationships exist between the components of the magnetic susceptibility:

$$\frac{d\mathrm{Re}(\chi(\omega))}{d\ln(\omega)}=\frac{2}{\pi}\mathrm{Im}(\chi(\omega))=\frac{\chi_0}{\ln(\tau_2/\tau_1)}.$$

Based on this model and assuming, without loss of generality, that the 3 frequencies are chosen in geometric progression ($f_2^2 = f_1 \cdot f_3$), the vector modelling the magnetic effect can be normalised to $\text{Re}(\chi(\omega_2))$ and written as:

$$M^T = [-(1+\sigma), -1, -(1-\sigma), k\sigma, k\sigma, k\sigma],$$

$$\text{where } \sigma = \frac{\chi_0 \ln(f_2/f_1)}{\text{Re}(\chi(\omega_2))\ln(\tau_2/\tau_1)}, k = \frac{\pi}{2\ln\left(\frac{f_2}{f_1}\right)}.$$

The conductive ground model considered for this example assumes that the size of the coil is small and that the value of the ground conductivity is moderate. With these assumptions, it can be shown that the real part of the received signal is negligible, while the imaginary part is proportional with the frequency and the vector modelling the conductivity becomes:

$$C^T = [0,0,0,f_1/f_2, 1, f_3/f_2].$$

In the absence of metallic targets, the detector adjusts the variables g(t), m(t) and c(t) such that the estimated ground signal tracks the received signal as accurately as possible. The way the tracking process is implemented is not essential, as long as the separation between the slow loop and fast loop is taken into account. For illustrative purposes, in the following we give an example of a basic implementation.

Every time a new set of samples is obtained, the strength of the coupling $g(t_k)$ between the coils and the ground is calculated by minimising the estimation error $\mathring{a} = R - \hat{R}$. For the purpose of performing this minimisation the vector G(t)=m(t)M+c(t)C from equation (1) is assumed to be a constant. A suitable choice for the cost function is:

$$X^2 = \sum_{i=1}^{6} w_i (R_i - g(t)G_i)^2, \quad (2)$$

where the weights $w_i$ can be used to fine tune the fitting process. The deterministic solution of this least-squares-error problem is given by:

$$g(t_k) = \frac{\sum_{i=1}^{6} w_i R_i G_i}{\sum_{i=1}^{6} w_i G_i^2}.$$

It can be seen that this simple loop tracking g(t) is very fast, since it acts on a sample-by-sample basis. Other implementations are possible, where some of the dynamic response could be traded-off for increased tracking accuracy.

Having determined the coupling g(t) between the coils and the ground, an update of the loop tracking the magnetic and conductive contributions can be performed. This loop can be implemented as a Kalman filter tracking the two independent random variables m(t) and c(t). Their dynamics is poorly known, but reasonable limits can be put on their permissible range of values and speed of variation. This a priori knowledge is sufficient to build a simple Gauss-Markov process. The equation (1) with the current value of $g(t_k)$ constitutes the measurement equation for the Kalman filter and its residual error in (2) is an estimate of the measurement noise. As for g(t), by varying the time constants in the transition matrix it is possible to trade-off accuracy for speed of adjustment.

At each step, the difference $R - \hat{R}$ represents the response of the detector with most of the ground interfering signals removed. The residual error in (2) gives a measure of the 'noise' (due to the ground and other causes) still present in the detector output. The statistics of the residual error can be used as a guide for setting the threshold for target detection.

There are a few other considerations regarding the above method for removing the ground interference.

The models described above for the magnetic and conductive response of the ground should not be seen as limiting. For example, in certain situations (large coils, non-magnetic but conductive ground), the real part of ground conductivity can become detectable. In such case the in-phase components of the C vector would be non-zero. In other cases the model for the magnetic ground presented above could be inappropriate and more parameters could be required or even tracked in real-time.

It is implicit in equation (1) that the magnetic and conductive signals have the same dependence on the height above the ground, through g(t). While this is not strictly the case, the differences are small. If greater accuracy is required, correction factors dependent on g(t) (e.g. powers of g(t)) can be included in either contribution (magnetic or conductive).

If available, independent measurements (like ground penetrating radar surface return, ultrasonic or infra-red sensors) can be incorporated to improve the determination of g(t). Alternatively, if g(t) can be calibrated versus height, it can be used to improve the determination of target depth, monitor the quality of the swing etc.

In the interest of simplicity, the derivatives with respect to frequency have not been included in the above formalism. Their addition is quite straightforward and, for single frequency operation, it is a necessity. The reason is that, while for 2 or more frequencies tracking the 3 variables g(t), m(t) and c(t) leads to an over determined system, for 1 frequency the system is under determined. In this case and in terms of the simple models presented above, the derivative of the in-phase component is related to the magnetic loss, while the derivative of the in-quadrature component is directly related to the conductive loss.

The processing described above is suitable for both real-time and off-line processing (e.g. for geophysical applications). In the later case the slow loop, for determining m(t) and c(t), can be implemented to track in two dimensions (in space) instead of one dimension (along track).

As mentioned above, the presence of a metallic target can be revealed by a sudden increase in the fitting error for g(t). However, determining the type of target (discrimination) is not straightforward, because the process of ground interference removal can strongly affect the measurement of the target. In order to illustrate the problem and a method to mitigate its effects we consider the following situation: the detector running the algorithm described by equation (1) and tracking the ground perfectly encounters a target with the in-air measured parameters:

$$A^T = [AI_1, AI_2, AI_3, AQ_1, AQ_2, AQ_3]$$

The received signal can be written as:

$$R = g(t)G + a(t)A, \quad (3)$$

where the first term is the real ground signal (also equal to the estimated ground signal) and the second term is the target with a response modulated by its own coupling factor. The fast tracking loop will try to fit a value for g'(t) such that it minimises the difference between the estimate (1) and the measurement (3). Due to the fact that A≠G, g'(t) will be a bad approximation of the real value of the ground-coupling signal g(t); for the same reason, the difference between R and R̂ will be a bad approximation for the target parameters. However, the fact that the residual error of the fit will be large will indicate the presence of a target. This will stop the slow loop from updating G and will trigger a fit more complicated than (2):

$$X^2 = \sum_{i=1}^{6} w_i(R_i - g(t_k)G_i - A_i(t_k))^2 \quad (4)$$

where $A(t_k) = a(t_k)A$ is the combined estimate of the target strength and parameters at the current step. Differentiating (4) with respect to $g(t_k), A_i(t_k)$ and equating the derivatives to zero leads to a simultaneous system of equations that can be solved to determine both the ground-coupling coefficient $g(t_k)$ and the target parameters $A_i(t_k)$.

It is known that when the magnetic response of the ground is very strong and the target signal is small, determining the type of the target (and in particular the ferrous/non-ferrous discrimination) is very difficult. While the method described above allows the disentanglement of ground and target signals, the case of a small target in mineralised ground poses the added problem of performing this operation when the signal to noise ratio is poor. In this situation the method described below leads to the best 'a posteriori' decision.

In difficult soil conditions the in-quadrature parameters of the target are less contaminated with 'ground noise' than the in-phase parameters. Therefore, the shape and the duration of the target signal, a(t), is best determined from the in-quadrature parameters. This experimentally determined function is then used as a template for a matched filter and all parameters of the target are determined at the same time. It should be noted that the above method could also be applied in salty conditions with the channels reversed (i.e. the in-quadrature channels are contaminated with ground noise, so the matched filter template is obtained from the in-phase channels).

Finally, the post-processing block 12 transmits the results to the operator as audio and/or visual signals. The results can also be sent via digital communications means to other devices like computers, for more advanced processing and/or data logging.

A problem faced by a multiple frequency digital metal detector is related to the relative magnitude of the signals generated by metallic targets versus the signals generated by certain types of ground. Ground containing significant amounts of iron oxides generates large induced signals approximately in quadrature with the current in the transmitting coil. The fact that the multiple frequency digital metal detector separates the two channels (I and Q) for each frequency after the analogue-to-digital conversion, means that the effective gains of the channels are the same. Therefore, the ADC employed in such a detector should have a resolution about 100 times better than the ADC used in the conventional metal detector with ground tracking (with different gains for the two channels) for similar performance. However, increased resolution from an ADC required to sample at more than twice the highest transmitted frequency is generally difficult to achieve at reasonable price.

The above mentioned problem can be alleviated by extending the dynamic range of the detector such that the signal presented to the ADC input makes full use of its dynamic range most of the time. There are several ways of achieving extended dynamic range, which can be used separately or in combination:

Control of the gain of the receiver. Using a programmable gain amplifier, it is possible, within certain limits, to maintain the output of the receiver close to the optimum level. However, the values of the gain have to be calibrated for each individual unit such that appropriate corrections (static and/or dynamic) are applied every time the gain setting is changed. Without corrections, target detection would be very difficult, due to glitches in the demodulated signals.

Control of the strength of the transmitted signal. This is based on the fact that the transmitter is a linear power amplifier. Therefore, if broadband configuration is used for the transmitting coil or, in the case of tuned configuration, if the quality factor of the tuned circuits is not too high, reasonably accurate and fast control over the amplitude of the transmitted signal can be achieved. However, reducing the strength of the transmitted signal is equivalent to a reduction in the effective number of bits of the DAC, so this method is limited by the resultant increase in the distortion of the transmitted signals.

In the case of the hybrid digital metal detector, pairs of synchronous demodulators 12 for each transmitted frequency demodulate the received signal. The synchronous demodulators can be implemented either with analogue switches or doubly balanced mixers. They receive demodulation signals from the digital signal-processing block 1, corrected for the phase shift between the digital signal generator and the transmitted magnetic field. In addition to this correction, the demodulation signals have the phase controlled such that in each pair of synchronous demodulators one is continuously maintained in phase with the ground signal, while the other is maintained orthogonal to the ground signal. This requires the post-processing block 12 to monitor the pairs of channels and control the digital signal-processing block 1 to maintain the tracking of the ground signal. The synchronously demodulated components of the received signal are passed to the pairs of low-pass filters 11b. These filters are also capable to amplify the demodulated signals, with low gain for the component in phase with the ground signal and high gain for the component orthogonal to the ground signal. The resulting signals are digitised by the ADC 14 and sent to the post-processing block 12.

It is to be understood that the above description relates to the preferred embodiments only and is not to be limiting. Other embodiments may fall within the scope of the invention.

The invention claimed is:

1. A metal detector of the continuous wave type including;
a transmission circuit and a transmitter coil adapted to produce an interrogating magnetic field for detection of a target;
a receiving coil and a receiving circuit adapted to receive and process a receive signal produced by a target and its environment in the interrogating field;
further including at least one digital signal generator adapted to generate at least one pair of reference sinusoidal signals of the same frequency;
wherein there is produced one or more output signals which are a linear combination of selected of said reference signals, said output signals being applied to a transmitter which produces at least one transmission signal said transmission signal being applied to the transmission circuit and transmitter coil combination to produce an interrogating magnetic field for detection of a target.

2. The metal detector of claim 1 wherein the digital signal generator generates two sinusoidal reference signals in quadrature.

3. The metal detector of claim 1 wherein the sinusoidal reference signals are produced with constant amplitude, substantially undistorted and substantially free of spurious signals.

4. The metal detector of claim 1 wherein the sinusoidal reference signals are generated using a method combining a direct digital synthesis method with a method producing mathematically correct results employing trigonometric identities.

5. The metal detector of claim 4, wherein the reference signal value corresponding to an angle $\phi$, which differs from an angle $\theta$ for which the reference signal value is tabulated by an amount $\delta$ such that $\phi=\theta+\delta$, is generated using the trigonometric identities:

$\cos(\phi)=\cos(\theta+\delta)=\cos(\theta)+[\alpha\cos\theta-\beta\sin\theta]$, $\sin(\phi)=\sin(\theta+\delta)=\sin(\theta)+[\alpha\sin\theta-\beta\cos\theta]$, and wherein $\alpha=-2\sin^2(\delta/2), \beta=\sin(\delta)$, and where for computational convenience values of $\alpha$ and $\beta$ can be stored in an auxiliary table.

6. The metal detector of claim 1 including means adapted to monitor the current through and/or the voltage across the transmitter coil and/or the transmission circuit, the values provided by said current or voltage monitoring being processed in combination with the receive signal to identify, at least in part, those components of the received signal which are due to the changes in the transmit coil parameters produced by targets or varying soil or environmental conditions.

7. The metal detector of claim 6 wherein the processing of the monitored current and/or voltage values results in determination of the instantaneous phases and amplitudes of the signals transmitted by the transmitting coil.

8. The metal detector of claim 7 wherein the means to monitor include, within the transmission circuitry, a sensor element operatively connected to the transmitting coil, the voltage across which or the current through which, is amplified, filtered and applied to an analogue to digital converter to produce a digital signal proportional to the current in the transmitting coil.

9. The metal detector of claim 8 wherein the sensor element includes a low value resistor, current transformer, low value inductor or large value capacitor.

10. The metal detector of claim 8 wherein the means to monitor includes amplifying the total voltage across the transmitting coil and sensor element, filtering this and applying it to an analogue to digital converter.

11. The metal detector of claim 6 wherein the values of current and/or voltage are used to detect and correct for abnormal operating conditions including transmitting coil short-circuit or open-circuit.

12. The metal detector of claim 6 wherein the values of current and/or voltage are used in conjunction with the digital signal generator to find one or more resonant frequencies of the transmitting circuit and therefore to reduce the current consumption of the transmitter or to maximize the current through the transmitting coil.

13. The metal detector of claim 1 wherein there are means to monitor the values of receiving coil parameters which vary in use, the parameter values provided by said monitoring being processed in combination with the receive signal to identify, at least in part, the varying component of the received signals which is due to changes in the receive coil parameters produced by targets and varying soil or environmental conditions.

14. The metal detector of claim 13 wherein the means to monitor includes the generation of a pair of additional reference signals having a frequency different to any one or all of the frequencies of the transmitted signal or harmonics thereof, one of the additional reference signals being applied to the receiving coil with a suitable magnitude, the resultant signal in the receiving coil being detected by the receiving circuitry as part of the receive signal, the resultant signal being separated from the receive signal by post-processing to determine receiving coil parameters.

15. The metal detector of claim 1 where the output signal is a digitally constructed signal and is applied to a digital to analogue converter to generate a transmission signal that is substantially a linear combination of sinusoidal signals and applied to the transmitter which is a linear amplifier.

16. The metal detector of claim 15 where the frequencies of the reference signals are not integer multiples of each other.

17. The metal detector of claim 15 where the relative amplitudes of the sinusoidal signals that make up the transmission signal are controlled to maximize the response of specific targets or to avoid the saturation of the receiver and/or analogue to digital converter following the receiver.

18. The metal detector of claim 15 where the transmission circuit includes at least one circuit consisting of a transformer where each winding has substantially the same inductance as the transmitter coil and connected such that two signals of different frequency can be applied to the transmitter coil without each significantly influencing the other.

19. The metal detector of claim 1 wherein the digital signal generator generates an output signal that is substantially a square wave.

20. The metal detector of claim 19 wherein the frequency of one of the reference signal pairs is the fundamental frequency of the square wave and the other reference signal pairs are harmonics of the fundamental.

21. The metal detector of claim 19 wherein the output signal is applied directly to the transmitter, which is a switching amplifier.

22. The metal detector of claim 1 where the transmit signals are modulated in one of a multitude of possible modulations and the receive signals are demodulated and low pass filtered to yield the in phase and in quadrature components and their derivatives with respect to frequency at each transmitted frequency.

23. The metal detector of claim 1 where ground related components in the receive signal are substantially separated from target related signals in the receive signal using a method that employs models for the ground which include an independent magnetic component and an independent conductive component, the method further including the effects of varying coupling between the transmitter coil or the receiving coil and the ground.

24. The metal detector of claim 23 wherein the ground signal is estimated continuously with estimates for the values of the magnetic and conductive components are updated over a longer time span than estimates for the value of the coupling.

25. The metal detector of claim 23 wherein a model employed is that of a super paramagnetic medium.

26. The metal detector of claim 1 where the target components more contaminated with ground related signals are estimated using a matched filter employing as a template the target components less contaminated with ground related signals.

27. The metal detector of claim 1 where the amplitude-frequency and phase-frequency characteristics of each individual element and/or groups of elements are calibrated over the frequency ranges of interest.

28. A method for detecting metallic targets in a ground including the steps of
providing a transmission circuit and a transmitter coil adapted to produce an interrogating magnetic field for detection of a target;
providing a receiving coil and a receiving circuit adapted to receive and process a receive signal produced by a target and its environment in the interrogating field;
generating by digital means at least one pair of reference sinusoidal signals of the same frequency;
producing one or more output signals which are a linear combination of selected of said reference signals;
transmitting said output signal to produce the interrogating magnetic field for detection of a target.

29. The method of claim 28 wherein the sinusoidal reference signals are generated using a method combining a direct digital synthesis method with a mathematically correct method employing trigonometric identities.

30. The method of claim 29, wherein the reference signal value corresponding to an angle $\phi$, which differs from an angle $\theta$ for which the reference signal value is tabulated by an amount $\delta$ such that $\phi=\theta+\delta$ is generated using the trigonometric identities:

$$\cos(\phi)=\cos(\theta+\delta)=\cos(\theta)+[\alpha\cos\theta-\beta\sin\theta],$$

$$\sin(\phi)=\sin(\theta+\delta)=\sin(\theta)+[\alpha\sin\theta-\beta\cos\theta],$$

and wherein $$\alpha=-2\sin^2(\phi/2), \beta=\sin(\delta),$$

and where for computational convenience values of $\alpha$ and $\beta$ can be stored in an auxiliary table.

31. The method of claim 28 further including monitoring the values of parameters of the transmit coil which vary with time or with characteristics of the ground or with movement over the ground, the values provided by said monitoring being processed in combination with a received signal to identify, at least in part, that component of the received signal which is due to the changes in the transmit coil parameters produced by targets and varying soil or environmental conditions.

32. The method of claim 28 further including monitoring the values of receiving coil parameters which vary in use, the parameter values provided by said monitoring being processed in combination with the receive signal to identify, at least in part, the varying component of the received signals which is due to changes in the receive coil parameters produced by targets and varying soil or environmental conditions.

33. The method of claim 32 including the generation of a pair of additional reference signals having a frequency different to any one or all of the frequencies of the transmitted signal or harmonics thereof, one of the additional reference signals being applied to the receiving coil with a suitable magnitude, the resultant signal in the receiving coil being detected by the receiving circuitry as part of the receive signal, the resultant signal being separated from the receive signal by post-processing to determine receiving coil parameters.

34. The method of claim 32 further including the use of a digital signal generator and the values provided by said monitoring to find one or more resonant frequencies of the transmitting circuit and therefore to reduce the current consumption of the transmitter or to maximize the current through the transmitting coil.

35. The method of claim 28 where the output signal is a digitally constructed signal and is applied to a digital to analogue converter to generate a transmission signal that is substantially a linear combination of sinusoidal signals and applied to the transmitter which is a linear amplifier.

36. The method of claim 28 where the frequencies of the reference signals are not integer multiples of each other.

37. The method of claim 28 where the relative amplitudes of the sinusoidal signals that make up the transmission signal are controlled to maximize the response of specific targets or to avoid the saturation of the receiver and/or analogue to digital converter following the receiver.

38. The method of claim 28 further including the modulation of the transmit signal in one of a plurality of possible modulations and the receive signals are demodulated and low pass filtered to yield the in phase and in quadrature components and their derivatives with respect to frequency at each transmitted frequency.

39. The method of claim 28 where ground related components in the receive signal are substantially separated from target related signals in the receive signal using a method that employs models for the ground which include an independent magnetic component and an independent conductive component, the method further including the effects of varying coupling between the transmitter coil or the receiving coil and the ground.

40. The method of claim 39 wherein the ground signal is estimated continuously with estimates for the values of the magnetic and conductive components are updated over a longer time span than estimates for the value of the coupling.

41. The metal detector of claim 40 wherein a model employed is that of a super paramagnetic medium.

42. The method of claim 28 where the target components more contaminated with ground related signals are estimated using a matched filter employing as a template the target components less contaminated with ground related signals.

43. The method of claim 28 where the amplitude-frequency and phase-frequency characteristics of each individual element and/or groups of elements are calibrated over the frequency ranges of interest.

* * * * *